July 7, 1936.  A. M. TURNER  2,047,089
APPARATUS FOR DISINFECTING POULTRY ROOSTS
Filed June 1, 1934
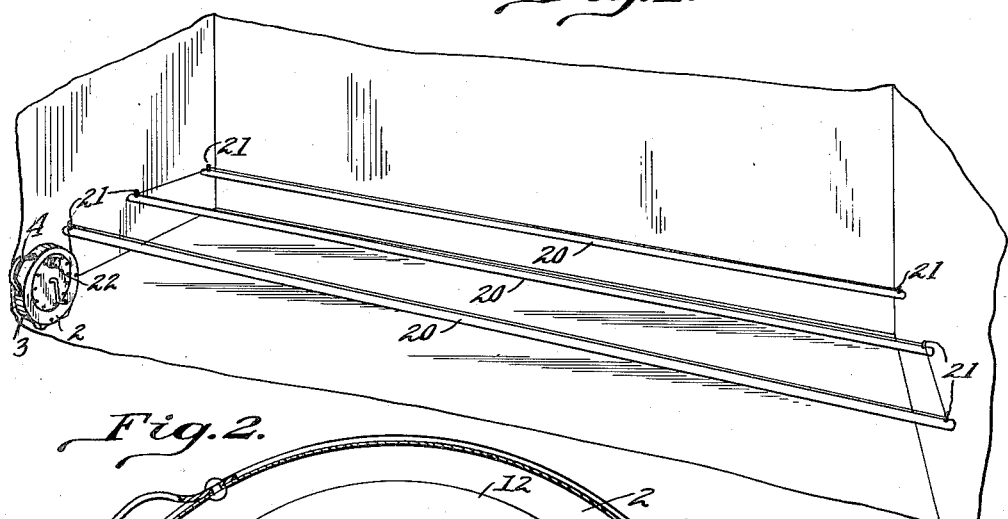
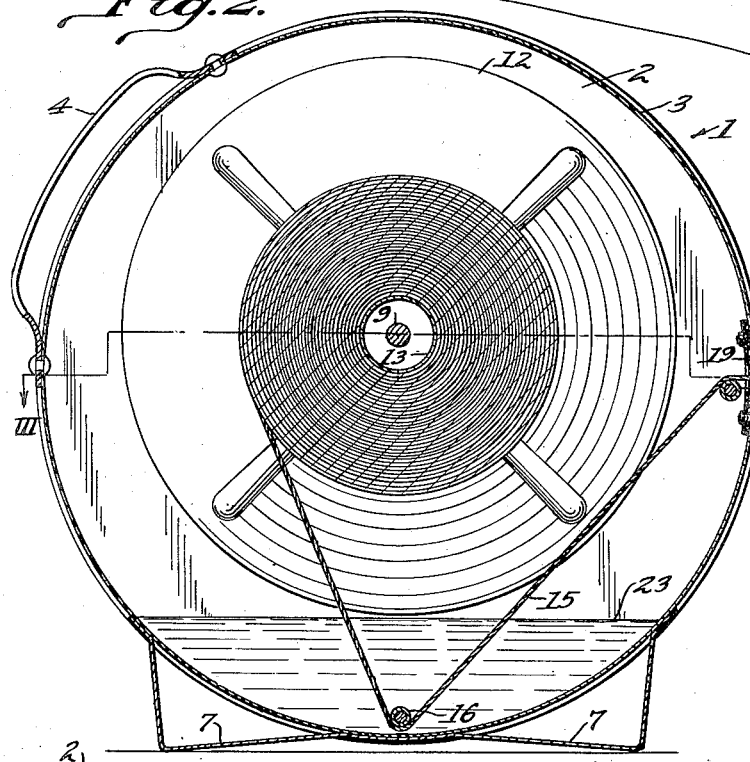
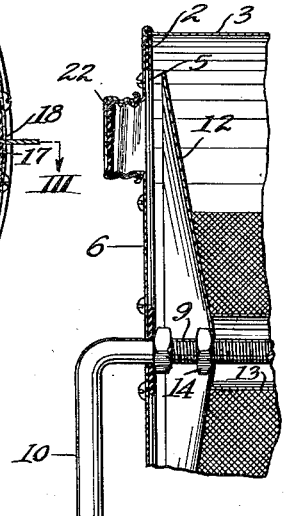
Inventor
Albert M. Turner
W. S. McDowell
Attorney Patented July 7, 1936

2,047,089

UNITED STATES PATENT OFFICE 2,047,089

APPARATUS FOR DISINFECTING POULTRY ROOSTS

Albert M. Turner, Mendon, Ohio

Application June 1, 1934, Serial No. 728,563

2 Claims. (Cl. 299—20)

This invention relates to appliances adapted for use in conjunction with poultry roosts for the purpose of applying a volatile disinfectant to the poultry perched upon said roosts to reduce or destroy parasitic life thereon, to the end of improving the health and condition of the affected fowls.

It is an object of the present invention to provide convenient and effective means by which a volatile disinfectant may be caused to permeate through the feathers of roosting poultry to destroy or remove lice, or other forms of parasitic life, which interfere with the health and growth of farm poultry, by providing in conjunction with roosting supports, a flexible cable, tape, rope or cord, either fabric, felt or fiber, adapted for the reception of a disinfectant or insecticide and capable of being arranged in parallel relationship with the roost so that the release of the volatile compound of the disinfectant may be effectively applied to the poultry during roosting periods in order to secure adequate and proper treatment and results.

Another object of the invention resides in apparatus for the purpose set forth which comprises a casing containing a reel and an associated cable, the bottom of the casing being formed to include a sump or reservoir in which is received a liquid disinfectant, and guide means are provided in connection with the casing for training the cable therethrough and through the bath of the disinfectant preparation, whereby as the cable is withdrawn from said reel and casing, it will contain a predetermined amount of the disinfectant, the cable being then trained longitudinally along the poultry roost for contact with vermin infected fowls.

For a further understanding of the invention, reference is to be had to the following description and the accompanying drawing, in which:

Fig. 1 is a perspective view of a poultry roost disclosing the disinfectant applying apparatus comprising the present invention in operative association therewith;

Fig. 2 is a vertical sectional view taken through the casing and reel mechanism of the appliance;

Fig. 3 is a horizontal sectional view on the plane indicated by the line III—III of Fig. 2;

Fig. 4 is a fragmentary vertical sectional view showing the filling cap and operating crank.

Referring more particularly to the drawing, the numeral 1 designates the casing of the appliance. In the present instance, this casing is formed from sheet metal and is substantially circular in configuration, the frame involving spaced vertical side walls 2—2 and a substantially circular transverse connecting wall 3 at the periphery thereof. The wall 3 may be provided exteriorly with a handle 4 for the convenient transportation of the casing. One of the side walls 2 is formed with an opening 5 which is covered by means of a removable closure or lid 6, providing access to the interior of the casing. Connected with the lower part of the wall 3 are base straps 7 which permit the casing to be supported in an upright position on a suitable base or foundation.

The wall 2, opposed to the wall having the opening 5 formed therein, is provided internally with a stationary bracket 8 designed for the rotatable support of one end of a reel shaft 9, the opposite end of said shaft being extended through an opening formed in the closure or lid 6 and has its exterior portion terminated in a crank 10. Rotatably connected with the shaft 9 and located within the casing is a reel 11, comprising spaced side members 12 and an axial collar 13. Nuts 14 may be threaded upon the shaft 9 to frictionally clamp the reel in connection with said shaft. Wound about the reel 11 is a cord or cable 15, which has its outer portion trained about a guide roll 16 located in a disinfectant receiving sump formed in the bottom of the casing. From the roll 16, the cable is directed upwardly over a guide 17 and is passed through an opening 18 formed in the wall 3 of the casing and, also, through a registering opening formed in a rubber wiper 19, the latter functioning to remove excess quantities of a disinfectant or insecticide from the cord, tape or cable as the cord is withdrawn from the casing.

In the use of my appliance, the free end of the cord, cable or tape is withdrawn from the casing and then trained longitudinally along or parallel with poultry roosts 20 which may be mounted in any desired manner in a poultry house. Preferably, the ends of the roosts 20 are provided with guide pins or eyes 21 around which the cord or cable passes in order to be maintained in close relationship with the upper portion of said roosts and to avoid interference with the normal movements or activities of the poultry occupying the roosts. When not in use, the cable may be disconnected from the roosts and by the operation of the crank 10 may be withdrawn into the casing and wound about the reel 11. A normally closed filling cap 22 is provided in connection with the lid 6 to admit of the introduction of the volatile liquid disinfectant or insecticide into the casing, the level of which has been indicated at 23 in Fig. 2 of the drawing.

The appliance comprising the present invention is simple to employ, may be readily connected in operative relation with poultry roosts, serves effectively to remove parasitic life from roosting fowls and, moreover, is economical in its consumption of the liquid disinfecting compound.

While I have described what I consider to be the preferred form of my present invention, yet it will be understood that the same is subject to considerable variation or modification without departing from the scope of the invention as the latter has been defined in the following claims.

What is claimed is:

1. An appliance for disinfecting poultry roosts comprising a casing having a sump formed in the bottom thereof for the reception of a liquid, a reel member mounted within said casing and disposed above said sump, exteriorly arranged means for rotating said reel member, a cable connected at one end with said reel, a guide member disposed in said sump and around which said cable is trained for passage through the liquid, a second guide member disposed in said casing adjacent to a cable outlet opening provided in the side wall of said casing above said sump, and a flexible wiping member carried by said casing contiguous to said outlet and disposed for engagement with said cable to remove excess liquid therefrom.

2. An appliance for disinfecting poultry roosts comprising a substantially circular casing formed to receive a liquid disinfectant in the bottom thereof, a reel member rotatably mounted eccentrically of said casing above the body of liquid normally contained therein, a shaft for said reel extending exteriorly of said casing and provided with an operating member for manually rotating said reel, a guide mounted in the liquid holding portion of said casing, a cable secured to said reel and trained around said guide for passage through said liquid, a cable outlet formed in the side wall of said casing above said liquid, and a flexible wiping member mounted in connection with said casing adjacent to said outlet and disposed for engagement with the cable following passage thereof through the liquid, whereby to remove excess liquid from the cable as the latter is withdrawn from the casing.

ALBERT M. TURNER.